Dec. 14, 1926. 1,610,482
H. A. STODDARD
WHEEL AND METHOD OF MAKING THE SAME
Filed May 29, 1919
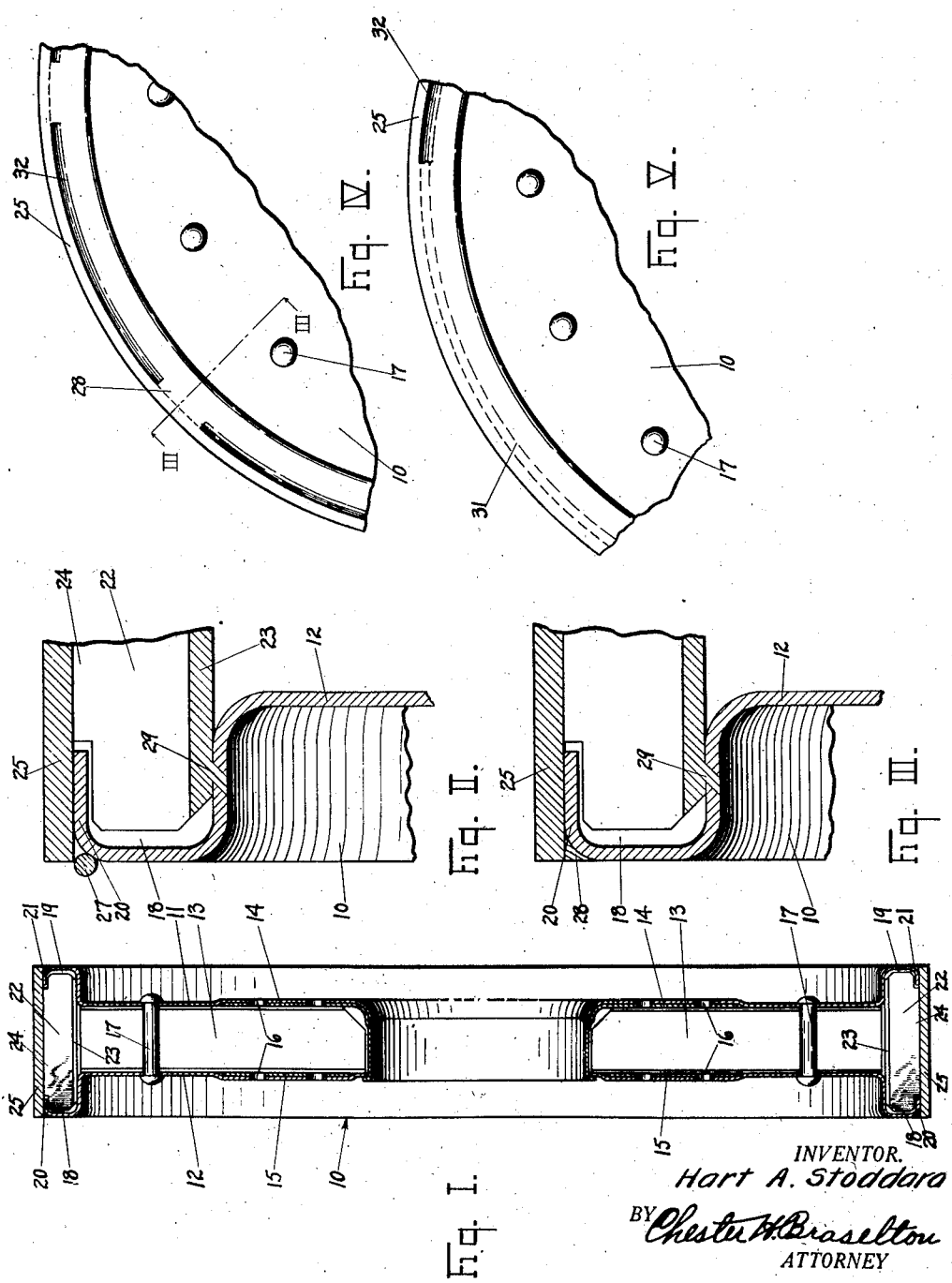
INVENTOR.
Hart A. Stoddard
BY Chester H. Braselton
ATTORNEY Patented Dec. 14, 1926.

1,610,482

UNITED STATES PATENT OFFICE.

HART A. STODDARD, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

WHEEL AND METHOD OF MAKING THE SAME.

Application filed May 29, 1919. Serial No. 300,607.

This invention relates to an improvement in wheels and the method of making the same, and is particularly applicable in connection with all-metal wheels especially of the disc type.

One object of the invention is to provide an improved method of securing a rim or felloe band in position upon the wheel.

A further object of the invention is to provide a wheel of the character described, which is of simple construction and efficient in operation.

A further object of the invention is to provide an improved method of constructing wheels of this character.

Further objects of this invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawing forming a part hereof, in which:

Figure I is a vertical, transverse, sectional view of an all-metal wheel, showing the relative position of the parts with respect to each other.

Figure II is an enlarged detail, sectional view through the wheel rim and a portion of the wheel, and showing the position of the fusible metal piece before the welding operation.

Figure III is an enlarged detail, sectional view taken along the line III—III of Figure IV, showing a rim and a portion of the wheel, and illustrating the relative position of the parts ofter the completion of the welding operation.

Figure IV is an enlarged, detail, side view of a portion of the wheel, illustrating the relative position of the fusible pieces circumferentially of the rim.

Figure V is an enlarged, detail view of a portion of the wheel in side elevation, illustrating a modified form of the invention wherein the fusible metal is applied throughout the entire circumference of the rim.

Referring to the drawing, similar reference characters designate corresponding parts throughout the several views, and the sectional view is taken looking in the direction of the small arrows at the ends of the section line.

In the manufacture of metal wheels of the type illustrated herewith, it has been found to be advisable to employ additional securing means for retaining the rim in position upon the wheel in addition to shrinking the rim upon the wheel. In the structure illustrated herewith, a plurality of metal pieces, which may be in the form of short sections of wire, are applied to the wheel in such a manner as to rest between the edge of the rim and the peripheries of the wheel discs and these portions are then fused by the application of heat thereto in such a manner as to form a weld between the edge of the rim and the metal discs for the purpose of firmly securing the parts together.

In the embodiment of the invention illustrated herewith, 10 indicates an all-metal wheel, the main portion of which is made up of a pair of metal discs 11 and 12 oppositely positioned with respect to each other and upon opposite sides of a spider unit including a plurality of radially positioned spoke members 13, which extend radially from the hub portion of the wheel toward the rim thereof. A substantially circular plate 14 is positioned between the metal disc 11 and the side portions of the radial braces 13, while a corresponding circular plate 15 is positioned in a similar manner between the metal disc 12 and the opposite sides of the radial brace members 13. A plurality of registering openings 16 are formed in the various plates in such a manner as to enable them to be properly held in position relative to each other by means of a plurality of bolts or rivets 17 adapted to be positioned within the registering openings.

In the formation of the rim portion of the wheel, the oppositely positioned discs 11 and 12 have the peripheral portions thereof struck out to form oppositely positioned registering channels 18 and 19, and peripheral flanges 20 and 21. A plurality of reinforcing members 22 are positioned transversely of the longitudinal plane of the wheel with their ends in the registering channels 18 and 19, each transverse reinforcing member being provided with flanges 23 which seat upon outwardly extending portions of the discs 11 and 12, and a web portion 24 which extends between the adjacent edges of the oppositely positioned flanges 20 and 21 to such a distance as to be substantially flush with the exterior surface of these flanged portions. The transverse flanges 23 of the reinforcing members are secured to the outwardly extending portions of the discs 11 and 12 by being spot welded thereto as indicated at 29.

A rim or felloe-band 25 is positioned upon the exterior of the flanges 20 and 21 and the projecting web portions 24 of the cross braces, the said rim being preferably shrunk upon these portions of the periphery of the wheel after the other parts have been properly assembled in position relatively to each other.

In the securing of the rim to the flanged portions of the wheels, a plurality of elongated fusible metal sections or pieces are employed, which, prior to the operation of fusing the same into the space between the edge of the rim and the flanges, may be in the form of short sections of wire, as indicated by 27 upon Figure II. These sections are preferably placed in position, as illustrated in Figure II, and then fused by the application of one of the electrodes of a spot welding machine thereto in such a manner as to form a weld between the edge of the rim and the flanged portion of the wheel as indicated at 28 in Figure III. In this manner the rim is firmly welded to the outer portion of the wheel at spaced intervals throughout the circumference thereof in such a manner as to firmly and rigidly secure the parts together, and form in effect an integral structure.

In the modified form of the invention illustrated in Figure V, the fusible metal section is of such length as to extend throughout the entire circumference of the rim so as to form a continuous weld firmly securing the rim to the wheel throughout the entire circumferential extent thereof, as indicated at 31. A portion of the welded metal section is broken away as indicated at 32 to illustrate the recess between the edge of the rim and the outer edge portion of the wheel before the fusing of the metal section therein.

It will be understood from the above description that this method of securing the rim to a wheel of the all metal type provides a simple and effective means for firmly securing these parts together, and insuring their retention in position at all times and under all conditions of use.

The method above described is also adapted for use in connection with any of the usual forms of wheel structures, wherein the felloe portion thereof is formed of metal, and upon which a rim is seated. A wheel of the form illustrated and described above is particularly adapted for use in connection with trucks, tractors and the like, where it is necessary to provide a firm and rigid wheel structure.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitation within the terms of the following claims, in which it is my intention to claim all novelty inherent in my invention broadly as well as specifically.

What I claim as new and desire to secure by Letters Patent is:

1. In a wheel structure, the combination of a pair of parallel spaced discs provided with peripheral laterally-extending flanges, a rim seated on said flanges, and a plurality of separate pieces of metal fused into the spaces separating both edges of the rim from the respective flanges and securing the rim to said flanges.

2. In a wheel structure, the combination of a pair of spaced, parallel discs each having a peripheral channel portion formed therein, said channel portions opening toward each other, transverse reinforcing members bridging the space between the peripheral portions of said discs and having their ends disposed in said channel portions and welded to the inner side walls of said channel portions, a rim seated on said transverse reinforcing members and the outer side walls of said channel portions, and metal pieces fused into the spaces between the edges of said rim and the said outer side walls to secure the rim thereto.

In testimony whereof, I affix my signature.

HART A. STODDARD.